United States Patent [19]

Michaud, Jr.

[11] Patent Number: 4,793,646
[45] Date of Patent: Dec. 27, 1988

[54] ADJUSTABLE INTERLOCKING TELESCOPIC HANDLE AND ARM ASSEMBLY

[75] Inventor: Fernand L. Michaud, Jr., Milford, Conn.

[73] Assignee: Northeast Marine, Inc., North Branford, Conn.

[21] Appl. No.: 86,156

[22] Filed: Aug. 17, 1987

[51] Int. Cl.[4] .............................................. B63B 21/04
[52] U.S. Cl. ...................................... 294/19.1; 285/7; 285/303; 15/143 B; 15/144 B; 16/115; 114/221 R
[58] Field of Search ...................... 294/19.1, 19.2, 1.1; 285/298, 302, 303, 398, 7; 15/143 B, 144 B; 16/115; 114/221 R; 172/375

[56] References Cited

U.S. PATENT DOCUMENTS

| | | | |
|---|---|---|---|
| 2,319,992 | 5/1943 | Hubbard | 294/19.1 |
| 2,606,050 | 8/1952 | Morris et al. | 172/375 |
| 2,980,456 | 4/1961 | McMullin | 16/115 |
| 3,913,515 | 10/1975 | Hernsjo et al. | 114/221 R |
| 4,247,216 | 1/1981 | Ponsini | 15/144 B |

Primary Examiner—James B. Marbert
Attorney, Agent, or Firm—Mattern, Ware, Stoltz & Fressola

[57] ABSTRACT

By providing at least two elongated, telescopically engaged tube members which incorporate therein a spring biased, dual locking pin structure in combination with tube aligning and centralizing zones, a unique, adjustable handle and arm assembly is achieved which is capable of being easily moved into a plurality of alternate positions and securely engaged in each position, with unwanted dislodgement or lateral wobbling or movement being completely eliminated. In the preferred embodiment, the elongated telescopically engaged tube members are constructed with cooperating enlarged diameter zones and reduced diameter zones to prevent the unwanted disengagement of the tube members. In addition a plurality of alternate operative end units can be quickly and easily mounted to said elongated handle and arm assembly, with one of said end units comprising a unique mooring clasp and book hook construction.

10 Claims, 1 Drawing Sheet

U.S. Patent  Dec. 27, 1988  4,793,646
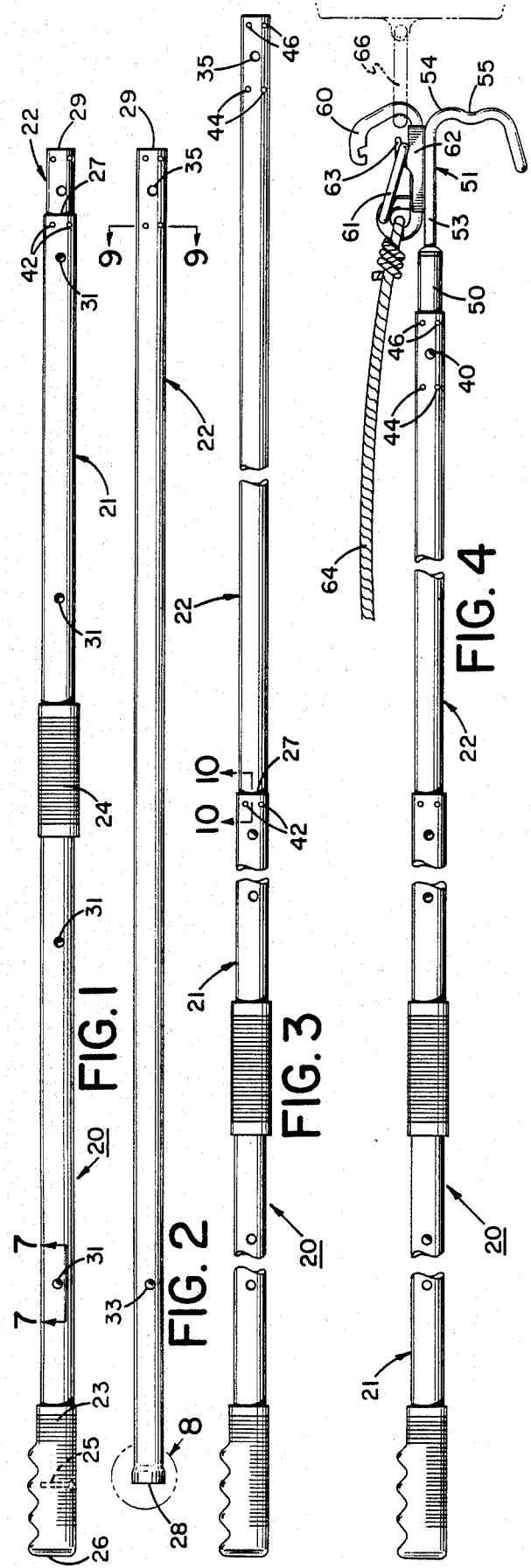
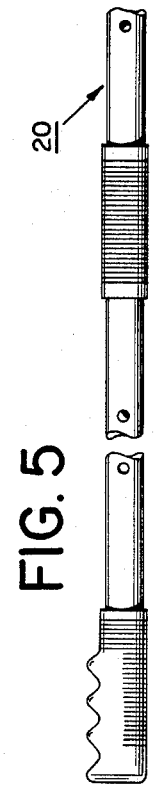
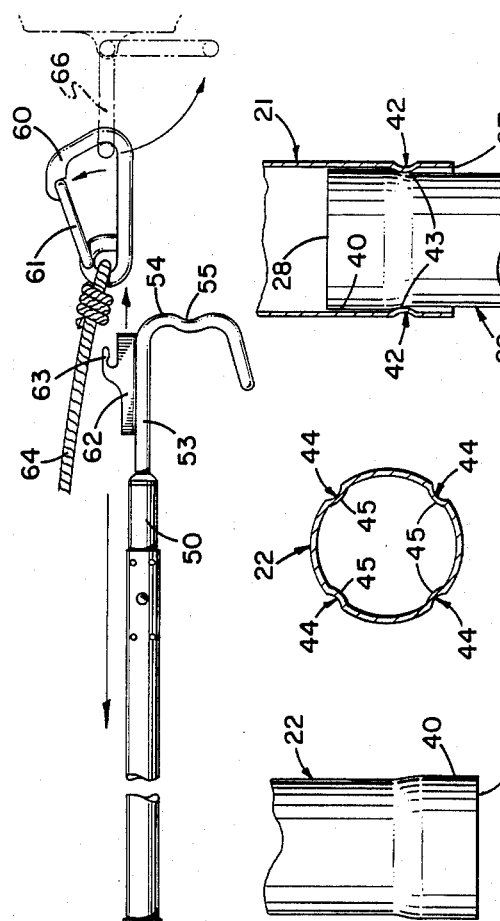
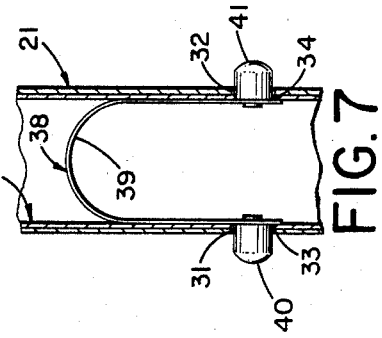
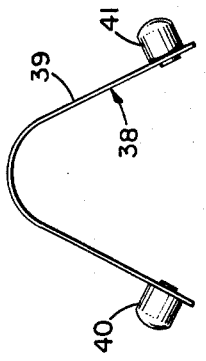

ADJUSTABLE INTERLOCKING TELESCOPIC HANDLE AND ARM ASSEMBLY

TECHNICAL FIELD

This invention relates to adjustable handle and arm assemblies, and more particularly to elongated telescopically engaged handle and arm assemblies wherein said components are capable of being moved into a plurality of alternate positions of varying lengths.

BACKGROUND ART

In order to accommodate the varying needs of users, adjustable handle and arm assemblies have been made incorporating two elongated tube members telescopically engaged with each other. However, such prior art handle and arm assemblies have traditionally suffered from many similar drawbacks.

In general, the tube members are constructed to be adjustably movable into a plurality of alternate lengths. However, in typical prior art constructions, the various methods employed are incapable of providing secure engagement of the members in these various alternate positions. Typically, position locking means are employed wherein a single, spring loaded pin member extends through co-axially aligned, pre-drilled holes formed in the elongated tube members, in order to allow the members to be locked in varying positions, providing different overall lengths. However, these single pin members are easily dislodged during use, causing either complete collapse or total separation of the handle and arm assembly, when not desired.

In other constructions, wherein attempts have been made to eliminate this problem, a dual pin construction has been employed where two, independent plastic strips are used, each of which incorporates a pin member at opposed ends thereof. In this way, two pins, diametrically opposed from each other, are used to lock the elongated tube members in their alternate positions. However, this construction has been found to be incapable of providing the desired secure, locked engagement, since the plastic members tend to lose their inherent spring force, and therefore are easily dislodged during use, when such dislodgement is not desired.

In addition to pin members, eccentrically mounted cams have also been employed in order to allow the telescoping members to be positioned in a variety of alternate locations. However, these eccentrically mounted cams have suffered from unwanted binding, complete collapse, or separation, thereby preventing the user from being able to enjoy the flexibility for which the cam member had been intended. As a result, the user is unable to adjust the handle and arm assembly into any desired alternate position, and is incapable of using the telescoping feature for which the system had been intended.

Another drawback commonly found in prior art handle and arm assemblies is the inability of the inside, telescoping tube member to be securely mounted within the holding tube member in a manner which allows the telescoping member to be wobble free, or otherwise free of lateral movement. Prior art attempts which have been made to eliminate this problem have typically centered upon the use of plastic bushings mounted on the outer tube member, with the bushings of the inside diameter substantially equal to the outside diameter of the telescoping tube portion. In this way, the wobble or lateral movement of the inside tube member is intended to be eliminated.

In practice, however, this common solution has been completely unsuccessful, since the bushings become dislodged, thereby eliminating their presence and causing the inside tube member to be completely free to move laterally, as well as become separated from the cooperating tube member. Alternatively, the bushings become either enlarged with use, thereby preventing their efficacy in eliminating lateral movement, or cause the telescoping member to bind in unwanted positions, thereby preventing the inside tube member from being capable of freely telescoping along its entire length.

A further problem found in virtually all prior art handle and arm assemblies is the ease with which the tube members can be completely separated. In general, prior art handle and arm assemblies do not possess any positive interlock feature to assure that the tube members are always co-axially aligned for telescopic movement. As a result of this failure, prior art systems typically encounter tube separation during use, which may cause the loss of the tube member.

Therefore, it is a principal object of the present invention to provide an adjustable handle and arm assembly incorporating elongated telescopically engaged tube members which are capable of free, unobstructed slidable movement therebetween, when desired, while also being securely locked in a plurality of alternate positions, free from unwanted dislodgement and tube separation.

Another object of the present invention is to provide the adjustable handle and arm assembly having the characteristic features described above, which also completely eliminates unwanted wobbling or lateral movement between the telescopically engaged tube members.

Another object of the present invention is to provide the adjustable handle and arm assembly having the characteristic features described above, which is capable of quickly and easily receiving and securely mounting thereto any one of a plurality of alternate operative ends.

Another object of the present invention is to provide the adjustable handle and arm assembly having the characteristic features described above, wherein said operative ends, when securely mounted to the elongated handle and arm assembly, are also secured thereto, free of unwanted dislodgement, while also being completely free of unwanted wobbling or lateral movement relative thereto.

Another object of the present invention is to provide an adjustable handle and arm assembly having the characteristic features described above, which also provides retention of the inner tube member with the outer elongated tube member, thereby eliminating undesired or accidental removal or loss of the telescopically engaged inner tube member.

Other and more specific objects will in part be obvious and will in part appear hereinafter.

SUMMARY OF THE INVENTION

The present invention overcomes the difficulties and drawbacks previously found in prior art systems by providing an adjustable handle and arm assembly which incorporates at least two elongated, telescopically engaged tube members which are adjustably positioned into various alternate, desired lengths and securely retained in any desired position by a spring-loaded dual pin construction. In addition, the outer tube member incorporates a plurality of tube aligning, centralizing, and holding dimples peripherally formed about at least one end thereof in order to securely position and maintain the inner, telescopically adjustable tube member in a central position, coaxially aligned therewith and free from unwanted wobbling or lateral movement.

All of the plurality of operative ends securely affixable to the adjustable handle and arm assembly of the present invention also incorporate spring-loaded dual pin constructions for assuring secure locked engagement of the operative end with the tube member. Furthermore, the receiving end of the tube member into which the operative en is inserted and securely affixed also incorporates tube aligning, centralizing, and holding dimples peripherally formed about the end thereof, in order to prevent unwanted wobbling or lateral movement of the particular operative end affixed to the handle and arm assembly of the present invention.

In a further feature of the present invention, the inner, telescopically movable tube member is constructed with its inside mounted terminating end formed in an enlarged or flared configuration. In this way, the telescopically movable inner tube member is capable of being axially moved relative to the outer tube member, into any particular desired position, but is incapable of being separated from the outer tube member, since the flared end thereof engages the tube aligning, centralizing, and holding dimples formed in the cooperating end of the outer tube member. In this way, unwanted removal or disengagement of the tube members is eliminated and secure, retained engagement of the telescopic members relative to each other is assured.

As with most prior elongated adjustable handle and arm assemblies, the present invention is constructed for use with a plurality of alternate operative ends in order to perform any particular desired function. Typically, these operative ends include a wide variety of different brushes, mops, and brooms, each designed for achieving a particular type of cleaning function. Although not specifically limited to one particular area of use, the elongated, adjustable arm and handle assembly of the present invention is particularly constructed for boat use, and for receiving mops, brushes, and brooms for use in scrubbing decks, boats, and dock areas. Furthermore, the operative ends would also be useable both for various functions such as washing surfaces, assisting in fishing or assisting in docking or mooring. By employing the present invention, the user is able to operate from greater distances, both conveniently and easily, in view of the secure, retained interengagement of the tube members forming the handle and arm assembly of this invention.

Furthermore, the tube interlocking feature of the present invention, wherein the telescopically engaged tube members are incapable of being accidentally separated or disassembled, provides a further important feature of this invention. In boat use in particular, prior art handle and arm assemblies often suffer from separation of the telescopically engaged tube members, which frequently causes complete loss of the tube members as they are dropped overboard into the water. As a result, the locking feature of the present invention is of particular interest and importance in the area for which the handle and arm assembly of the present invention is intended.

The invention accordingly comprises an article of manufacture possessing the features, properties, and relation of components which will be exemplified in the articles hereinafter described and the scope of the invention will be indicated in the claims.

THE DRAWINGS

For a fuller understanding of the nature and objects of the invention, reference should be had to the following detailed description taken in connection with the accompanying drawings, in which:

FIG. 1 is a plan view of the elongated adjustable handle and arm assembly of the present invention with the telescopically engaged tube members thereof shown in their fully engaged position;

FIG. 2 is a plan view of the inner tube member of the handle and arm assembly of the present invention;

FIG. 3 is a plan view, partially broken away, showing the handle and arm assembly of the present invention with the telescopically engaged tube members shown in their fully extended position;

FIG. 4 is a plan view of the handle and arm assembly of the present invention with a combined docking hook and clam securing member shown affixed to the end thereof, in position ready for use;

FIG. 5 is a plan view of the handle and arm assembly of FIG. 4, showing the clamp member disengaged from its holder;

FIG. 6 is a top plan view of the dual spring-loaded locking pin construction of the present invention shown completely removed from the tube member;

FIG. 7 is a cross-sectional side elevational view taken along line 7—7 of FIG. 2, showing the dual spring loaded locking pin construction of this invention securely positioned in place;

FIG. 8 is an enlarged plan view of the flared end of the tube of FIG. 2;

FIG. 9 is a cross-sectional end view taken along line 9—9 of FIG. 3; and

FIG. 10 is a side elevational view, partially in cross-section, taken along line 10—10 of FIG. 3.

DETAILED DESCRIPTION

As shown in FIG. 1, the preferred construction of handle and arm assembly 20 of the present invention comprises a first, outer elongated tube member 21 and a second, inner elongated tube member 22 coaxially aligned with tube member 21 and telescopically engaged therewith. In FIG. 2, the overall construction of inner, elongated tube member 22 can best be seen.

Although capable of being made in a variety of alternate lengths, it has been found that the elongated handle and arm assembly of the present invention is best constructed with tube members 21 and 22 each comprising an overall length of between about two feet and five feet. In this way, a variety of alternate, overall lengths can be quickly and easily obtained, while providing a handle and arm assembly which can be easily managed by one person and is capable of meeting virtually all uses for which a handle and arm assembly is to be employed.

As shown in FIGS. 1 and 3, inner tube member 22 is co-axially mounted within tube member 21 for telescopic, slidable, interengagement therewith. In this way, tube members 21 and 22 combine to form handle and arm assembly 20 having a plurality of alternate, overall length positions into which the tube members can be co-operatively placed, depending upon the particular application for which handle and arm assembly 20 is to be employed.

In order to assist in the ease and comfort of use, handle and arm assembly 20 incorporates plastic or rubberized grip members 23 and 24 mounted to tube member 21. In the preferred construction, grip member 24 is mounted substantially midway along elongated tube member 21, while grip member 23 is mounted at the proximal end 26 of tube member 21. Although it has been found that frictional forces between grip members 23 and 24 and tube member 21 are generally sufficient to maintain grip members 23 and 24 in their desired positions, grip member 23 is mounted to elongated tube 21 by pin 25, which also provides a positive abutment stop for proximal end 28 of tube member 22.

In the preferred construction, both elongated tube 21 and 22 are formed of substantially equal overall lengths. In order to assure that telescopically engaged inner tube member 22 does not accidentally extend into outer elongated tube member 21 in a position wherein tube member 22 cannot be easily reached for telescopic movement, pin 25 provides positive stop abutment beyond which elongated tube member 22 cannot extend. Consequently, in its fully engaged position, as shown in FIG. 1, tube member 22 has a substantial portion thereof extending beyond distal end 27 of tube member 21. As a result, this construction assures that tube member 22 can always be easily reached and securely held for telescopic movement relative to tube member 21.

As best seen in FIG. 1, elongated outer tube member 21 comprises a plurality of post-receiving holes 31, each being formed substantially perpendicularly into the side thereof in juxtaposed, spaced relationship with each other. Preferably, the central axis of holes 31 are all aligned in a substantially straight line, with said line being parallel to the central axis of elongated tube member 21. In addition, a plurality of cooperating, post-receiving holes 32 are formed in the opposed side of tube member 21, diametrically opposite holes 31.

In the embodiment shown in FIG. 1, elongated tube member 21 incorporates four, separate pairs of independent post-receiving holes 31 and 32 formed along the length thereof. As detailed below, these pairs of post-receiving holes establish the various alternate positions into which inner tube member 22 can be secured, to provide the varying overall lengths for handle and arm assembly 20 of the present invention. Although it has been found that the use of four pairs of post-receiving holes spaced substantially equidistant along the length thereof provide the optimum number of useful positions, any number of cooperating post-receiving holes can be employed, without departing from the scope of the present invention.

As shown in FIG. 2, inner elongated tube member 22 comprises a post-receiving hole 33 formed therein near proximal end 28 and a second post-receiving hole 35 formed in tube member 2 adjacent distal end 29.

As detailed above in reference to elongated tube 21, tube 22 also incorporates cooperating post-receiving holes diametrically opposed to post-receiving holes 33 and 35. As shown in FIG. 7, post-receiving hole 34 comprises one such diametrically opposed hole formed in the side of elongated tube 22 opposite post-receiving hole 33.

By referring to FIGS. 6 and 7, the construction and operation of spring-loaded dual-post locking means 38 can best be understood. In the preferred construction, spring-loaded dual-post locking means 38 comprises a substantially continuous, elongated strip member 39 which comprises an inherent spring force associated therewith. In the preferred construction, strip 39 comprises an elongated spring metal strip preferably consisting of stainless steel.

In this preferred construction, metal strip 39 is formed in a substantially E-shape, as shown in FIG. 6, with locking posts 40 and 41 fixedly mounted to the opposed ends of elongated strip 39. Post 40 and 41 are mounted to strip 39 at their bases, and comprise outwardly extending, substantially cylindrically shaped bodies having a diameter less than the diameter of the post-receiving holes formed in tube members 21 and 22.

Whenever the terminating ends of elongated strip 39 are moved towards each other, the inherent spring force of metal strip 39 is placed under compression, causing metal strip 39 to resist such movement by producing an opposing spring. As a result, when spring-loaded, dual-post locking means 38 is mounted within elongated tube 22, as shown in FIG. 7, the inherent spring force of elongated metal strip 39 causes mounting posts 40 and 41 to be forced through cooperating, diametrically opposed holes 33 and 34, securely maintained in that position by the spring forces of metal strip 39.

Furthermore, as shown in FIG. 7, mounting post 40 also extends through post-receiving hole 31 of elongated tube 21, while post 41 extends through post-receiving hole 32 of elongated tube 21. With post 40 and 41 extending through the cooperating post-receiving holes 31–33 and 32–34, elongated tubes 21 and 22 are in locked interengagement, incapable of being telescopically moved or adjusted, until posts 40 and 41 have been dislodged from their locked position.

By forming spring-loaded, dual-post locking means 38 with a continuous, elongated spring metal strip 39, accidental dislodgement or collapse of cooperating, telescopically engaged tube members 21 and 22 is completely eliminated. In view of the substantial spring forces generated by elongated, continuous, metal strip 39, accidental dislodgement of both locking posts 40 and 41 is virtually impossible. As a result, elongated telescopically engaged tube members 21 and 22, once placed in the desired position, remain securely locked in that position until the user elects to alter the position.

While incapable of being accidentally dislodged, posts 40 and 41 can be quickly and easily adjusted for movement into an alternate position by merely having the user press mounting posts 40 and 41 towards each other, while simultaneously sliding tube 21 relative to tube 22 in the direction desired. In this way, the user is able to force posts 40 and 41 out of interlocked engagement with post receiving holes 31 and 32. Once unlocked, tube member 21 slidingly overrides posts 40 and 41 until the next desired position is reached.

As soon as another pair of post-receiving holes are aligned with posts 40 and 41, posts 40 and 41 automatically extend into locked engagement with the cooperating pair of post receiving holes, securely locking the elongated, adjustable handle and arm assembly 20 of the present invention in the next desired position.

In addition to being quickly and easily movably adjustable into any of the plurality of alternate locked positions provided by the handle and arm assembly 20 of the present invention, another feature of this invention is to assure that telescopically engaged tube members 21 and 22 are incapable of being separated from each other. As discussed above, in many applications, particularly when handle and arm assembly 20 is employed in the boating field, the accidental telescopic disengagement of inner tube member 22 from outer tube member 21 often causes the complete loss of inner tube member 22, with the tube member being dropped into the water and unable to be retrieved. In order to eliminate this possible extremely adverse consequence, handle and arm assembly 20 of the present invention is constructed with tube members 21 and 22 in locked interengagement, once assembled, so as to prevent any possibility that the telescopically engaged tube members can be disengaged or separated from each other.

One aspect of the tube interlock system of the present invention is best seen in FIG. 8, wherein proximal end 28 of inner tube 22 is shown in detail. As depicted therein, the terminating end of proximal end 28 comprises a flared or enlarged section 40 which effectively provides inner tube member 22 with a proximal end having an overall outer diameter which is substantially greater than the outer diameter of the remainder of elongated tube member 22. Preferably, the outer diameter of flared section 40 of inner tube member 22 is maintained just slightly less than the inner diameter of tube member 21.

In this way, tube member 22 with flared section 40 is capable of axial telescopic slidable movement along substantially the entire length of tube member 21, while virtually eliminating any lateral wobbling which would other occur from the difference between the outer diameter of tube 22 and the inner diameter of tube member 21. Consequently, by providing flared zone 40 at the terminating end 28 of tube member 22, the lateral wobbling typically encountered with prior art handle and arm assemblies is eliminated.

In addition, handle and arm assembly 20 of the present invention also incorporates a plurality of dimples 42 formed circumferentially about outer tube member 21 adjacent distal end 27. Although any number of dimples 42 can be circumferentially formed in tube member 21, it has been found that the incorporation of four independent dimples 42 are sufficient to establish the desired abutment zone.

As clearly shown in FIG. 10, when dimples 42 are circumferentially formed in tube member 21, on inwardly facing, convex surface 43 is formed inside tube member 21 about each dimple 42. The inwardly facing convex surfaces 43 formed about each dimple 42 effectively establish a substantially reduced inner diameter zone for tube member 21 directly adjacent distal end 27. As clearly shown in FIG. 10, this reduced diameter zone forms a stop abutment for larger diameter flared section 40 of inner tube 22. Consequently, whenever inner tube member 22 is telescopically extended to its full length in an attempt to remove inner tube member 22 from outer tube member 21, removal becomes impossible due to the stop abutment interference and locking securement provided by convex surfaces 43 of dimples 42 directly contacting and abutting flared section 40 of tube member 22.

In the preferred embodiment, the diameter overlap between convex surfaces 43 of dimples 42 and flared section 40 of tube member 22 prevent any attempt to disengage tube member 22 from outer tube member 21. Generally, additional force merely causes further binding interengagement of convex sections 43 with the flared section 40, without successfully removing tube member 22 from tube member 21. As a result, accidental dislodgement or removal of tube member 22 from tube member 21 is eliminated and the handle and arm assembly 20 of the present invention effectively provides a secure tube interlocking system whereby accidental loss of the inner tube member from the outer tube member is eliminated.

In addition to providing the secure tube interlocking features detailed above, dimples 42 with their convex inwardly facing surfaces 43 also establishes a reduced diameter zone which is slightly greater than the outer diameter of inner tube 22. In this way, inner tube member 22 is capable of axial telescopic sliding movement along tube member 21, while eliminating lateral wobbling typically encountered from the diametric differences encountered in prior art handle and arm assemblies. In addition to providing a secure tube interlock system, the handle and arm assembly of the present invention is also virtually wobble free and establishes a more secure, rigid handle and arm assembly without annoying lateral flexing or wobbling.

In addition to the lateral flexing or wobbling of the tube members which is typically encountered in prior art handle and arm assemblies, prior art assemblies also suffer from flexing or wobbling of the interconnecting shaft between the inner tube member and the operative end connected thereto. In the present invention, this lateral movement and wobbling is completely eliminated by forming two independent circumferential rings of dimples 44 and 46 into distal end 29 of inner tube member 22, directly adjacent post receiving hole 35. As detailed above in reference to dimples 42 of tube member 21, it has been found that each circumferential ring of dimple members should comprise at least four independent dimples 44 and 46 formed directly into the side wall of tube member 22.

As detailed in FIG. 9, the plurality of dimples 44 each comprise an inwardly facing convex surface 45 which cooperate to form a reduced diameter zone. Although a single ring of dimples 44 may be sufficient to provide the desired wobble-free effect, it has been found that by providing two independent rings of dimples 44 and 46, two separate and independent reduced diameter zones are formed, on each side of post receiving hole 35.

In this way, when the supporting shaft of the operative end is inserted into inner tube 22 and securely locked therewith by engagement of the spring loaded, dual-pin locking means 38 associated therewith, in post receiving hole 35, and its diametrically opposed post receiving hole 36, the operative end supporting shaft is locked in position and is effectively secured to tube member 22 free from lateral movement or wobbling since the reduced diameter zone established by dimples 44 and 46 comprise a diameter substantially equal to the outer diameter of the operative end supporting shaft. In this way, secure, wobble-free mating engagement of any desired operative end with tube member 22 is attained and the handle and arm assembly of the present invention can be used more effectively and efficiently, without fear of unwanted shifting movement or wobbling of the supporting shaft and its particular operative portion.

Although handle and arm assembly 20 of the present invention is constructed for mating, interlocking, wobble free interengagement of any desired operative end with inner tube member 22, one particular operative end is shown in view of the unique construction of this operative end. However, the scope of the present invention is not in any way limited to this particular operative end since the handle and arm assembly 20 of the present invention is particularly designed for mating interconnection and secure wobble free engagement with any desired conventional operative end.

In FIG. 4, the unique, combined boat hook and mooring clasp construction of this invention is shown securely affixed to tube member 22 of handle and arm assembly 20 of this invention.

In the particular embodiment shown in FIG. 4, shaft 50 represents the type of shaft all operative ends would employ. In this embodiment, a boat hook 51 is securely mounted to one end of shaft 50 and extends therefrom. Although boat hooks have been employed in a variety of alternate shapes and configurations, boat hook 51 of the present invention comprises an elongated substantially straight support section 53, extending from shaft 50, which is then formed into a substantially E-shaped section 54.

Furthermore, E-shaped section 54 comprises a recess 55, substantially mid-way therealong, which provides a rope control zone. In this way, ease of control, movement and manipulation of ropes or tow lines can be achieved, more quickly and easily than typically found using prior art boat hook constructions. In addition, as with all boat hooks, the terminating end thereof can be easily employed in the conventional fashion using handle and arm assembly 20 in any desired overall length position, taking fully advantage of the secure, wobble free tube interengagement and interconnection features attained thereby and detailed above.

In addition to boat hook 51, this unique operative end also incorporates a mooring clasp 60 which comprises a spring-loaded arm 61. Furthermore, as shown in FIG. 4, mooring clasp 60 is removably mounted in a holding bracket 62 which securely holds spring-loaded arm 61 in the open position, allowing mooring clasp 60 to be easily positioned in engagement with any desired ring or other retaining means.

Although mooring clasp 60 and bracket 62 are prior art structures which presently exist in the boating industry, there is no structure which combines mooring clasp 60 and bracket 62 into a single, unitary construction combined with a boat hook as shown in FIGS. 4 and 5. In the embodiment of the present invention, bracket 62 is welded directly to section 53 of boat hook 51 in order to provide the secure retained mounting interengagement of bracket 62 with boat hook 51. By combining these two generally common elements into a single, unique, operative end construction, a novel boat securing end is attained, whereby the operator can manipulate the vessel into any desired position by employing boat hook 51 into any desired position and then quickly, easily and conveniently securely affix the vessel to the desired location by employing mooring clasp 60 in the manner detailed below.

By referring to FIGS. 4 and 5, the ease of use of mooring clasp 60 when combined with the unique boat hook construction 51 as a combined operative end for handle and arm assembly 20 of the present invention can best be understood. In its conventional use, mooring clasp 60 is securely affixed to a rope line 64, which is readily accessible to the user of handle and arm assembly 20. In addition, prior to its use, mooring clasp 60 is mounted in bracket 62 with locking arm 61 of mooring clasp 60 mounted to bracket 62 in its open position, with locking arm 61 retained in the open position by upstanding holding finger 63 of bracket 62.

When the boat operator is approaching the dock or a mooring location, handle and arm assembly 20 would be quickly and easily adjusted into the precisely desired overall length position in the manner detailed above, and boat hook portion 54 of hook 51 is employed to position the boat directly adjacent the desired mooring location. Then mooring clasp 60 is inserted into mooring ring 66, or any other desired holding means.

Once mooring clasp 60 has been inserted into ring 66, quick and easy secure engagement therewith is readily achieved by pulling handle and arm assembly 20 away from ring 66. In this way, mooring clasp 60 will be retained in engagement with ring 66, causing mooring clasp 60 to become disengaged from bracket 62. As soon as locking arm 61 has slid out of engagement with holding finger 63 of bracket 62, locking arm 61 is moved into its closed, locked position by the spring means associated therewith. As a result, mooring clasp 60 is securely locked about ring 66 allowing the user to pull on rope line 64 in order to make the desired secure mooring engagement at the precisely desired position.

As detailed above, the combined boat hook, mooring clasp and bracket head assembly detailed above represents one of a plurality of assemblies which can be quickly and easily mounted to handle and arm assembly 20 of the present invention. However, all conventional end units or assemblies, such as mops, brooms, brushes, cable holders, hooks, scrubbers, gaffs, etc. are mountable to a shaft 50 and would be quickly and easily secured to handle and arm assembly 20 of the present invention in order to achieve the particular desired result performed by that end assembly. Consequently, it should be understood that all end assemblies can be efficaciously employed with handle and arm assembly 20 of the present invention, provided such end assemblies are securely affixed to a mounting shaft 50 for cooperative, locked, wobble free engagement with handle and arm assembly 20.

It will thus be seen that the objects set forth above, among those made apparent from the preceding description are efficiently attained and, since certain changes may be made in the above article, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. An easily adjustable, securely interlocked handle and arm assembly comprising:
   A. a first elongated tube member incorporating
      a. a plurality of locking zones formed along the length of said tube, with each of said zones
         1. establishing an alternate position for adjusting the operative length of the handle and arm assembly, and
         2. comprising a pair of post-receiving holes formed in the wall of the tube member in juxtaposed, spaced, facing, diametrically opposed relationship to each other, and
      b. a reduced diameter zone formed at one end of said first elongated tube member; and
   B. a second elongated tube member telescopically engaged with said first tube member for sliding interengagement therewith, with one end thereof maintained within said first tube member and the opposed end thereof maintained outside the first tube member, and incorporating a. at least two locking zones formed at opposed ends of said tube member, each of said locking zones comprising a pair of post-receiving holes formed in the wall of the tube member in juxtaposed, spaced, facing diametrically opposed relationship to each other, b. a reduced diameter zone formed at the end of said tube member maintained outside of the first tube member, and c. an enlarged diameter zone formed at the end of said tube member maintained within the first tube member, said enlarged diameter being greater than the reduced diameter of the first tube member, thereby preventing removal of said second tube member from said first tube member; and C. at least one spring loaded, dual-post locking member a. mounted within said second elongated tube in cooperating interengagement with one of said pairs of post-receiving holes, and b. maintained with said post members thereof biased into locked interengagement with said post receiving holes, ready for locked interengagement with any pair of post receiving holes formed in said first elongated tube member, whereby said second elongated tube member can be quickly and easily moved into interlocked engagement with said first elongated tube member in any one of a plurality of locking zones formed along the length thereof, thereby providing a handle and arm assembly which can be quickly and easily adjusted to have its operative length changed to any particular desired configuration, while also preventing accidental removal of said second elongated tube member from said first elongated tube member.

2. The handle and arm assembly defined in claim 1, wherein both said first tube member and said second tube member are further defined as being substantially equal in length, with each of said tube members comprising an overall length of between about two feet and five feet.

3. The handle and arm assembly defined in claim 2, wherein said first elongated tube member further comprises c. a first hand grip mounted to the proximal end of said tube 1. providing an easily accessible, slip resistant zone about which the user can securely hold the tube member, and 2. effectively closing and sealing the proximal end of said tube member, thereby preventing removal of the second elongated tube member from telescopic engagement with said first elongated tube member.

4. The handle and arm assembly defined in claim 3, wherein said first elongated tube member further comprises d. a second hand grip mounted to said first tube member substantially mid-way along the length thereof, thereby providing an easily accessible slip resistant zone for the second hand of the user of said handle and arm assembly, and e. a fastening pin securely affixing said first hand grip to the proximal end of said first elongated tube member, with said fastening pin extending substantially the entire diameter of said tube member, thereby providing a positive abutment stop position against which the proximal end of said second elongated tube member is incapable of passing, whereby said second elongated tube member is securely retainingly engaged within said first elongated tube member, incapable of removal or disengagement therefrom, as well as being incapable of telescopic axial engagement with said first elongated tube member positioned whereby no portion of said second elongated tube member extends outwardly therefrom.

5. The handle and arm assembly defined in claim 1, wherein said enlarged diameter zone is further defined as comprising a flared portion formed adjacent the proximal end of said second elongated tube member effectively enlarging the diameter of said flared end to be slightly less than the inner diameter of the first elongated tube member, whereby said flared end is capable of telescopic sliding interengagement within the first elongated tube member, while stabilizing the second elongated tube member and preventing unwanted wobbling or lateral movement of the second tube member within the first tube member.

6. The handle and arm assembly defined in claim 5, wherein the reduced diameter zone of said first elongated tube member is further defined as comprising a plurality of independent depressions formed in the outer wall of the first elongated tube in a cirumferential ring peripherally surrounding the first elongated tube member in a zone adjacent the distal end thereof, with each of said recesses comprising an inwardly facing convexly shaped surface cooperatingly associated with the adjacent convexly shaped surface to establish therebetween an inner diameter slightly greater than the outer diameter of said second elongated tube member, whereby an effective stop abutment is established which frictionally engages the flared end of said second elongated tube member, thereby preventing removal of said second elongated tube member from said first elongated tube member.

7. The handle and arm assembly defined in claim 1, further comprising:

C. a plurality of mating end units, each constructed for assisting in performing a particular task, each of said end units incorporating a substantially continuous, elongated hollow shaft dimensioned for sliding interengagement with said second tube member and incorporating a. a pair of post receiving holes formed therein in juxtaposed, spaced facing diametrically opposed relationship to each other, and b. a spring loaded, dual post locking member positioned within said hollow tube with said post means extending out of the diametrically opposed post receiving holes, whereby any one of the plurality of operative ends can be quickly and easily securely affixed to the handle and arm assembly of the present invention by lockingly interengaging the post of said spring loaded dual post locking means within the post receiving holes formed at the distal end of the second tube member.

8. The handle and arm assembly defined in claim 7, wherein said second tube member is further defined as comprising a second reduced diameter zone formed at the distal end thereof directly adjacent the post receiving holes formed therein with said second reduced diameter zone being spaced away from said first reduced diameter zone, thereby providing a second reduced diameter zone having an effective diameter slightly greater than the outer diameter of the elongated shaft of said mating end unit, whereby said mating end unit is securely affixed to the distal end of said second tube member and incapable of wobbling or laterally shifting, thereby providing a secure, interlocked, interengaged construction free of unwanted movement.

9. The handle and arm assembly defined in claim 8, wherein said end unit is further defined as comprising
  c. a boat hook portion comprising a substantially E-shaped section and a substantially straight, elongated continuous support portion securely affixed to the terminating end of the tube engaging shaft,
  d. a mooring clasp bracket fixedly mounted to the support portion of the boat hook on the side opposite the E-shaped portion, and
  e. a mooring clasp incorporating a spring loaded arm removably mountable to said bracket for sliding engagement therewith, with said spring loaded arm held in the open position and disengagement therefrom, whereby such spring loaded arm quickly moves into engagement for closure of said clasp.

10. The handle and arm assembly defined in claim 1, wherein said spring loaded dual pin locking member is further defined as comprising:
  a. an elongated, substantially continuous strip of spring metal formed in a substantially E-shape, and
  b. two locking posts
    1. securely affixed to the opposite end of said metal strip, and
    2. each comprising an upstanding length greater than the difference between the outer diameter of the first tube member and the inner diameter of the second tube member, thereby assuring easily accessible locking posts which will extend through said post receiving holes formed in said tube member while also being readily accessible by the user for adjustments whenever desired.

* * * * *